United States Patent [19]

Stern et al.

[11] Patent Number: 4,702,605
[45] Date of Patent: Oct. 27, 1987

[54] ROCKER ARM SENSOR

[75] Inventors: Howard Stern, Greenlawn; Alex Mauro, Wheatley Heights, both of N.Y.

[73] Assignee: Robotic Vision Systems, Inc., Hauppauge, N.Y.

[21] Appl. No.: 825,203

[22] Filed: Feb. 3, 1986

[51] Int. Cl.⁴ .............................................. G01B 11/24
[52] U.S. Cl. ...................................... 356/375; 356/1; 356/376
[58] Field of Search ..................... 356/1, 2, 375, 376, 356/4

[56] References Cited

U.S. PATENT DOCUMENTS 4,402,608  9/1983  DiMatteo et al. .................. 356/375
4,652,749  3/1987  Stern ...................................... 356/1

OTHER PUBLICATIONS

Rioux, *Applied Optics*, vol. 23, No. 21, Nov. 1, 1984, pp. 3837–3844.

*Primary Examiner*—F. L. Evans
*Attorney, Agent, or Firm*—Max Fogiel

[57] ABSTRACT

An arrangement for scanning the measurement field of view of a three-dimensional measurement system, in which the measurement system is pivoted through a relatively small motion to scan a relatively large area of volume. The measurement system is rotated via a control unit which accurately controls the rotation. Mathematical corrections are applied to determine the true measured coordinates.

7 Claims, 4 Drawing Figures

ROCKER ARM SENSOR

BACKGROUND OF THE INVENTION

Optical triangulation has been successfully employed for obtaining three-dimensional (3-D) measurements of surfaces. This has been accomplished by projecting a plane of light and viewing the plane with a TV camera. Any surface intersecting the light plane reflects light along the line of intersection. Unless the surface is at an angle that prevents the reflected light from reaching the camera, an image of the line of intersection is obtained within the camera. Based on knowledge of the angle of light projection, distance from camera to projector and angle of the light received from the reflection, the distance from the camera/projector to the surface may be computed. This has the limitation of only providing measurements along the line of intersection which may not be adequate for an application requiring measurements over an area of the surface.

The measurement sensor formed by the camera and projector can be translated linearly by mechanical means to effect a scan of the surface. As the line of intersection scans the surface, it sweeps out an area on the surface over which 3-D measurements may be obtained. Although this is an effective way of obtaining data over a surface area, it is often undesirable to employ a translation table for reasons of cost, size, weight and complexity.

SUMMARY OF THE INVENTION

It is an object of the present invention to overcome the prior art disadvantages. In particular, it is the object of the present invention to provide an arrangement for scanning the field of view of a 3-D sensor.

In keeping with this object, and other objects which will become apparent as the description proceeds, the important characteristics of the invention are: the sensor can be scanned with a relatively lightweight, low cost mechanism; the scanned area can be large compared with the sensor motion enabling a small package size; the camera object plane maintains a constant position relative to the projected light plane; and the simplicity of implementation leads to inherent reliability.

The present invention is comprised of the following: a 3-D measurement sensor is constructed on a moveable plate. The 3-D sensor consists of a projected plane of light and an imaging camera oriented to have a common area for triangular intersection. The moveable plate is pivoted about an axis to provide the requisite scan of the triangular intersection. A mechanism is attached to the moveable plate which provides the requisite plate motion.

The invention will hereafter be described with reference to an exemplary embodiment, as illustrated in the drawings. However, it is to be understood that this embodiment is illustrated and described for the purpose of information only, and that nothing therein is to be considered limiting of any aspect of the invention.

DESCRIPTION OF PREFERRED EMBODIMENTS

Figure 1:
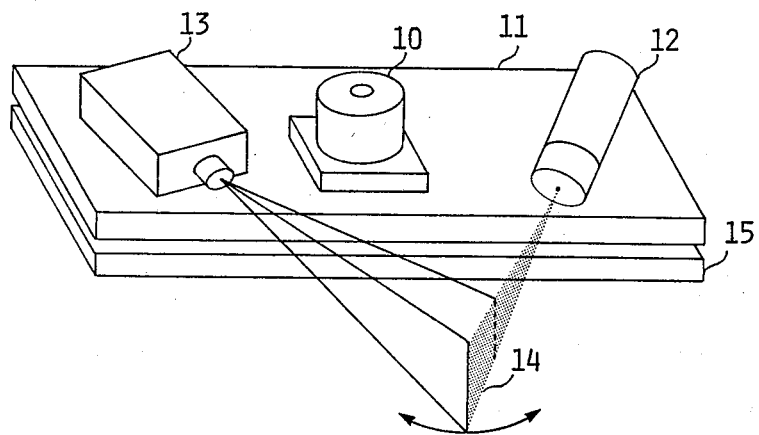
FIG. 1 is a schematic perspective view and shows a 3-D sensor mounted on a moveable plate, rotated by a motor.

FIG. 1 illustrates the mounting of a camera 13 on a plate 11 and a light source 12 also mounted on plate 11. Light source 12 projects a vertical plane of light when plate 11 is horizontal. The plane of light is projected in a direction such that a portion 14 of the plane is in the field of view of camera 13. Surfaces intersecting the light plane in the region 14 will reflect light from the plane, and camera 13 can form an image of the plane/surface intersection. By triangulation, the image position in camera 13 directly relates to the distance of the surface from the measurement sensor formed by camera 13, plate 11 and projector 12.

A very critical consideration in the design of a scanning 3-D sensor comprising a projected plane of light upon which a camera is focused is that, throughout the scanned volume, the light plane remains within the region of the camera that is well focused on its imaging surface (see U.S. Pat. No. 4,238,147) and the relative position of the light plane to the camera is invariant from the time of calibration to the time of use. This is accomplished in the present invention very efficiently by firmly attaching projector 12 and camera 13 to a rigid mounting plate 11. Thus, as the orientation of mounting plate 11 is altered, nothing acts upon the fixed relative orientation of camera 13 to projector 12. This assures that this critical requirement is met in a very simple and reliable manner.

A motor 10 is mounted upon plate 11 and its shaft is passed vertically through horizontal plate 11 to a mounting base 15. Plate 11 is thus supported by the axis of motor 10 above base 15, and is free to rotate relative to base 15 when driven by motor 10. When motor 10 rotates plate 11 back and forth a small amount, region 14 sweeps horizontally an amount equal to the angle of rotation of plate 11 times the distance from the pivot point to the region 14. Thus, the vertical light plane from projector 12 will sweep an area of a surface placed in region 14, and camera 13 can record the sequence of images to provide measurements of all points in the illuminated area.

Figure 2:
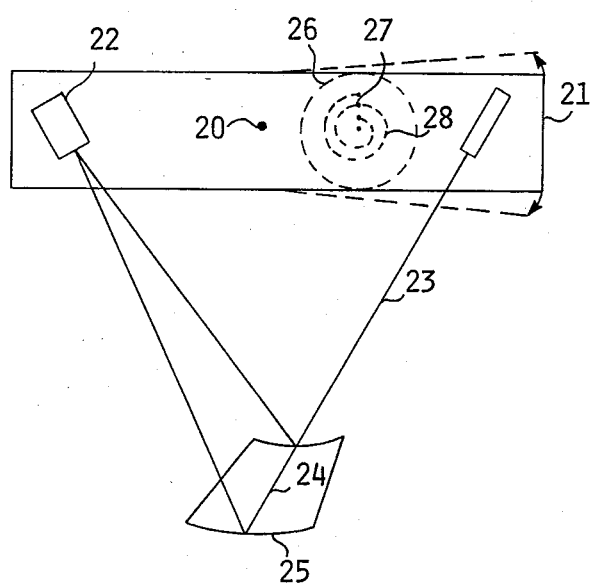
FIG. 2 illustrates an alternate means of driving the plate shown in FIG. 1.

FIG. 2 shows an alternate arrangement of obtaining the scanning effect. A pivot 20 supports plate 21 above a mounting surface. A motor on the mounting surface turns a disc 26 located under plate 21 in which a spiral groove 28 is cut to accept a cylindrical pin 27 protruding down from plate 21 and fixed permanently into plate 21. As the motor turns, pin 27 is moved to greater or lesser distances from the center of disc 26 as it rotates about its center and the spiral groove 28 exerts a force on the pin. The motion of pin 27 forces plate 21 to pivot about its supporting pivot 20.

Projected plane of light 23 has a region 24 that falls within the field of view of camera 22 mounted on plate 21. As plate 21 is rocked back and forth by oscillating disc 26, area region 24 sweeps out a volume region 25 within which measurements of surface areas may be obtained.

Figure 3:
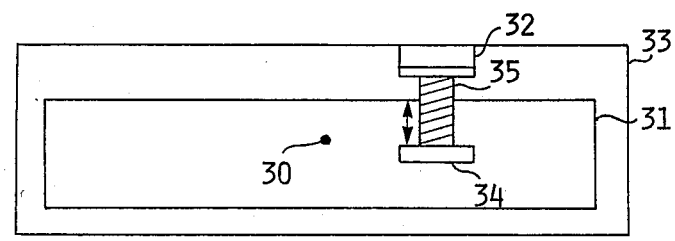
FIG. 3 illustrates a further embodiment for driving the plate.

FIG. 3 shows a second alternate embodiment of obtaining the scanning effect. A pivot 30 supports plate 31 above mounting surface 33. A motor 32 on mounting surface 33 turns a lead screw 35 that is threaded into block 34 which is attached to plate 31 via a pivot that enables block 34 to exert a force on plate 31 in the direction of the lead screw 35, and also enables block 34 to turn relative to plate 31 as plate 31 pivots about pivot 30 as a result of the force transmitted by block 34. By rotating lead screw 35 back and forth by several revolutions, plate 31 is oscillated about pivot 30. A camera and projector mounted on plate 31 to form a 3-D measurement sensor in the same manner as depicted in FIG. 2, therefore, would similarly sweep a volume within which measurement of surface areas may be obtained.

Figure 4:
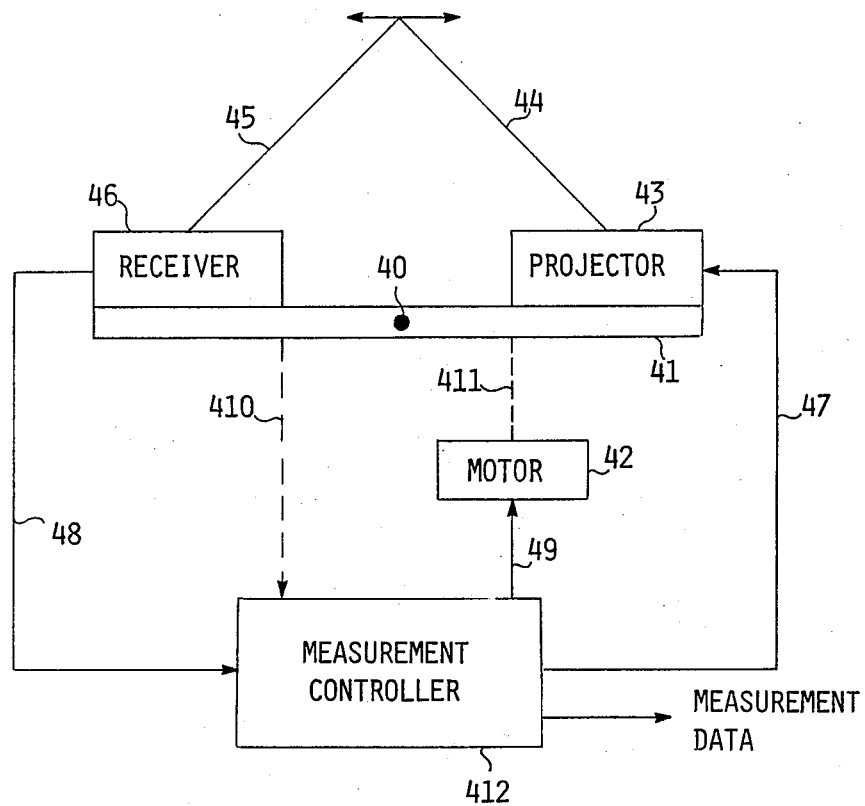
FIG. 4 is a block diagram of the overall measurement system.

In all the above arrangements, a measurement controller 412 as shown in FIG. 4 is required to coordinate all the activities of the scanned 3-D measurement sensor. Controller 412 directs motor 42 to move plate 41 by precise angular increments about pivot 40. Control signal 49 from Controller 412 may be analog or digital and motor 42 couples its motion to plate 41 via a mechanical coupling 411 of the forms shown in FIGS. 1, 2, 3 or similar arrangements. Controller 412 obtains precise knowledge of the angle of plate 41 from the inherent precision of the control signal 49, motor 42 and coupling 411 link to plate 41 or, if this link lacks the necessary precision, then from a precision feedback signal 410 from plate 41. Precision feedback signal 410 may be an encoder mechanism.

Controller 412 causes projector 43 to project a light plane 44 at specific instances of angular positions of plate 41 via control signal 47. Reflected light plane energy from a surface to be measured is received by camera 46 via path 45. An image of the reflected light is formed within camera 46 and converted to a video signal 48 transmitted to Controller 412. Controller 412 interprets video signal 48 in accord with calibrated measurements to provide the measurement coordinates of the scanned surface relative to plate 41. Controller 412 performs a coordinate rotation of the measurement coordinates equal to the angular rotation of plate 41 at the time the light plane 44 was projected by projector 43. Short projection times can "freeze" the scan motion and reduce blur of the surface data caused by the scan. The resultant rotated measurement data is then provided by the output of Controller 412.

The details of correcting for errors introduced by manufacturing tolerances in the construction of the scanning mechanism are given in a copending application Ser. No. 714,484 filed Mar. 21, 1985, now U.S. Pat. No. 4,652,749.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. An arrangement for scanning the field of view of an optical three-dimensional measurement sensor comprising: a three-dimensional measurement sensor with a projector and camera, said projector and camera having optical axes; said scanning being carried out through an angle contained in a plane formed by said optical axes of said projector and said camera; a motor mounted on said sensor a mounting base; a shaft fixed to said mounting base and centrally supporting said sensor; said motor imparting a rotary motion to said shaft about an axis substantially perpendicular to the plane formed by said optical axes of said projector and camera; said rotary motion being relative to said sensor; three-dimensional measurements being obtained from triangulation of the imaged reflection of a projected light beam.

2. An arrangement for measuring a surface area with a scanning optical three-dimensional measurement sensor, comprising: a three-dimensional measurement sensor with a projector and camera, said projector and camera having optical axes; said scanning being carried out through an angle contained in a plane formed by said optical axes of said projector and said camera; a motor mounted on said sensor a mounting base; a shaft fixed to said mounting base and centrally supporting said sensor; said motor imparting a rotary motion to said shaft about an axis substantially perpendicular to the plane formed by said optical axes of said projector and camera; said rotary motion being relative to said sensor; three-dimensional measurements being obtained from triangulation of the imaged reflection of a projected light beam; means for determining scan angle; and controller means comprising: means to synchronize light plane projections with scan angle, means for converting received image signals to measured coordinates relative to said sensor, and means for transforming said measured coordinates to coordinates relative to said mounting base.

3. An arrangement for scanning the field of view of an optical three-dimensional measurement sensor comprising: a three-dimensional measurement sensor with a projector and camera, said projector and camera having optical axes; said scanning being carried out through an angle contained in a plane formed by said optical axes of said projector and said camera; a mounting base; said sensor being pivoted about said mounting base; a disc pivoted about said mounting base; a spiral groove cut into said disc; a pin fixed to said sensor and engaged in said groove; and a motor to impart rotary motion to said disc, said motor thereby imparting a rotary motion to said sensor about an axis substantially perpendicular to the plane formed by said optical axes of said projector and camera; said sensor rotary motion being relative to said mounting base; three-dimensional measurements being obtained from triangulation of an imaged reflection of a projected light beam.

4. An arrangement for measuring a surface area with a scanning optical three-dimensional measurement sensor, comprising: a three-dimensional measurement sensor with a projector and camera, said projector and camera having optical axes; said scanning being carried out through an angle contained in a plane formed by said optical axes of said projector and said camera; a mounting base; said sensor being pivoted about said mounting base; a disc pivoted about said mounting base; a spiral groove cut into said disc; a pin fixed to said sensor and engaged in said groove; and a motor to impart rotary motion to said disc; said motor thereby imparting a rotary motion to said sensor about an axis substantially perpendicular to the plane formed by said optical axes of said projector and camera; said sensor rotary motion being relative to said mounting base; three-dimensional measurements being obtained from triangulation of an imaged reflection of a projected light beam; means for determining scan angle; and controller means comprising: means to synchronize light plane projections with scan angle, means for converting received image signals to measured coordinates relative to said sensor, and means for transforming said measured coordinates to coordinates relative to said mounting base.

5. An arrangement for scanning the field of view of an optical three-dimensional measurement sensor comprising: a three-dimensional measurement sensor with a projector and camera, said projector and camera having optical axes; said scanning being carried out through an angle contained in a plane formed by said optical axes of said projector and said camera; a mounting base; said sensor being pivoted about said mounting base; a linear actuator coupled from said mounting base to said sensor to impart rotary motion of said sensor about said pivot, said rotary motion being about an axis substantially perpendicular to the plane formed by said optical axes of said projector and camera; three-dimensional measurements being obtained from triangulation of the imaged reflection of a projected light beam.

6. An arrangement for measuring a surface area with a scanning optical three-dimensional measurement sensor, comprising: a three-dimensional measurement sensor with a projector and camera, said projector and camera having optical axes; said scanning being carried out through an angle contained in a plane formed by said optical axes of said projector and said camera; a mounting base; said sensor being pivoted about said mounting base; a linear actuator coupled from said mounting base to said sensor to impart rotary motion of said sensor about said pivot, said rotary motion being about an axis substantially perpendicular to a plane form by said optical axes of said projector and camera; three-dimensional measurements being obtained from triangulation of the imaged reflection of a projected light beam; means for determining scan angle; and controller means comprising: means to synchronize light plane projections with scan angle, means for converting received image signals to measured coordinates relative to said sensor, and means for transforming said measured coordinates to coordinates relative to said mounting base.

7. A method for obtaining measurement data by scanning the measurement field of view of a measurement system, comprising the steps of: providing a three-dimensional measurement sensor with a projector and camera, said projector and camera having optical axes; scanning through an angle contained in a plane formed by said optical axes of said projector and said camera by pivoting said sensor about a mounting base; controlling accurately said pivoting step; imparting rotary motion to said sensor in said pivoting step about an axis substantially perpendicular to the plane formed by said optical axes of said projector and camera; said sensor having a field of view; said rotary motion providing a scan of the field of view of said sensor through an angle contained in the plane formed by said optical axes of said projector and said camera; three-dimensional measurements being obtained from triangulation of the imaged reflection of a projected light beam; and determining true measured coordinates by mathematical corrections.

* * * * *